:

US006380342B2

(12) United States Patent
Irle et al.

(10) Patent No.: US 6,380,342 B2
(45) Date of Patent: *Apr. 30, 2002

(54) AQUEOUS COATING COMPOSITIONS, THEIR PREPARATION AND USE IN STOVING LACQUERS

(75) Inventors: Christoph Irle, Krefeld; Harald Blum, Leverkusen; Joachim Petzoldt, Monheim; Heino Müller, Leverkusen, all of (DE)

(73) Assignee: Bayer Aktiengesellschaft, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/371,822

(22) Filed: Aug. 11, 1999

(30) Foreign Application Priority Data

Aug. 17, 1998 (DE) .......................... 198 37 063
Aug. 17, 1998 (DE) .......................... 198 37 062

(51) Int. Cl.⁷ ............................................ C08G 18/62
(52) U.S. Cl. ..................... 528/75; 525/124; 524/840; 428/423.1
(58) Field of Search ..................... 525/124; 528/75; 524/840; 428/423.1

(56) References Cited

U.S. PATENT DOCUMENTS

| 4,325,946 A | 4/1982 | Bargiotti et al. ............. 424/180 |
| 5,210,154 A | 5/1993 | Weidemeier et al. ........ 525/438 |
| 5,336,711 A | 8/1994 | Schneider et al. ........... 524/507 |
| 5,460,892 A | 10/1995 | Bederke et al. ............. 428/482 |

FOREIGN PATENT DOCUMENTS

| CA | 2033530 | 7/1991 |
| CA | 2154980 | 2/1996 |
| CA | 2203868 | 10/1997 |
| DE | 3918510 | 12/1990 |
| DE | 4237957 | 5/1993 |
| GB | 1084203 | 9/1964 |

OTHER PUBLICATIONS

M. Bock, H. Casselmann, & H. Blum, Process in Development of Waterborne PUR–Primers for the Automotive OEM Industry. High Solids & Powder Coating Symp. New Orlearns, LA, Feb. 9–11, 1993.

*Primary Examiner*—Rachel Gorr
(74) *Attorney, Agent, or Firm*—Joseph C. Gil; Thomas W. Roy

(57) ABSTRACT

The present invention relates to an aqueous dispersion containing

A) a polyol component containing
   A1) 20 to 60 wt. %, based on the resin solids content of polyol component A), of a polyester resin containing 10 to 60 wt. %, based on the weight of the polyester resin, of one or more aliphatic, saturated or unsaturated monocarboxylic acids having 8 to 30 carbon atoms, and 0.4 to 5 wt. % of one or more radically polymerizable α,β-unsaturated mono- or di-carboxylic acids having 3 to 8 carbon atoms, or their anhydrides, and
   A2) 40 to 80 wt. %, based on the resin solids content of polyol component A), of a polyacrylate, which is prepared in the presence of component A1), and
B) 1 to 70 wt. %, based on the resin solids content of the aqueous dispersion, of one or more blocked polyisocyanates.

17 Claims, No Drawings

AQUEOUS COATING COMPOSITIONS, THEIR PREPARATION AND USE IN STOVING LACQUERS

BACKGROUND OF THE INVENTION

1. Field of the Invention

The present invention relates to aqueous coating compositions and to their preparation and use, especially for producing coatings that are resistant to chemicals and to the impact of stones.

2. Description of the Prior Art

In the automotive industry organic solutions of polyester resins, stoved with melamine resins or blocked polyisocyanates as hardener, have previously been used for coatings that are resistant to the impact of stones. A process for the preparation of these stoving fillers is described, for example, in DE-A 3,918,510.

Modern, aqueous binders are capable of replacing organic solvent-based binders in many applications. In some applications of such lacquers, such as in the automotive industry, the high property requirements for both the ready-for-use coating compositions and the resulting coatings have not been satisfied.

For example, EP-A 024,727 describes a stoving lacquer based on a combination of epoxy resin-phosphoric acid ester, a water-dilutable polyester and water-soluble melamine resins. DE-A 4,000,748 describes aqueous automotive fillers based on water-dilutable hydroxy-functional polyester-polyurethane resins, optionally other binders and water-soluble amino resins. DE-A 3,813,866 describes hydrofillers of water-dilutable polyurethane resins, water-dilutable polyesters modified with epoxy resins, and optionally water-dilutable aminoplastic resins.

The high demands which the automotive industry in particular places on filler coatings have not yet been completely met by those coatings. An improvement has been achieved with polyisocyanate-crosslinked filler coatings (M. Bock, H. Casselmann, H. Blum, "Progress in Development of Waterborne PUR-Primers for the Automotive Industry", Proc. Waterborne, Higher Solids and Powder Coatings Symp. New Orleans 1994). However, all of the coating compositions described have the disadvantage that the water-dilutable polyester or polyester-polyurethane resins used are very sensitive to hydrolysis and, thus, the systems have limited storage stability. These systems are not always able to meet high property requirements with regard to chemical resistance.

Hydrolytically stable aqueous dispersions can be prepared, for example, which are based on copolymers of (meth)acrylic acid esters. In addition to improved storage stability, polyacrylates also have greater resistance to chemicals than do polyesters or polyester-polyurethanes. Such systems are not used in the field of coatings that are resistant to the impact of stones, however, since lacquers based on polyesters or polyesters-polyurethanes are markedly superior to polyacrylates with respect to mechanical properties, especially elasticity.

DE-A 4,332,067 describes stoving lacquers based on polyacrylates prepared in low molecular weight oligoesters. The oligoesters used as the reaction medium for the radical polymerization have a molecular weight of <1000 g/mol. Advantages arising from the chemical linking of polyester and polyacrylate are not described. No indication is given of a polyol composition suitable for elastic coatings that is resistant to the impact of stones.

DE-A 4,427,227 describes a non-yellowing stoving lacquer based on a polyacrylate-grafted polyester and a water-dilutable melamine resin and/or a polyisocyanate which has been rendered hydrophilic. Again, polyol compositions suitable for elastic coatings that are resistant to the impact of stones are not disclosed.

An object of the present invention is to provide aqueous coating compositions which are storage stable and have improved resistance to chemicals and excellent resistance to the impact of stones.

Surprisingly, it has been found that this object can be achieved by the use of a combination of specific aqueous polyols and blocked polyisocyanates. The polyol dispersions according to the invention are characterized in that they contain graft copolymers based on polyester-polyacrylates in which the polyester component is based on long-chain aliphatic monocarboxylic acids and α,β-unsaturated carboxylic acids. The suitability of the polyol dispersions according to the invention as elastic stoving lacquers for automotive fillers is surprising because previously when stoving lacquers containing a high proportion of polyacrylate were used for automotive fillers, they did not satisfy the high property requirements with respect to elasticity and resistance to the impact of stones.

SUMMARY OF THE INVENTION

The present invention relates to an aqueous dispersion containing

A) a polyol component containing
   A1) 20 to 60 wt. %, based on the resin solids content of polyol component A), of a polyester resin containing 10 to 60 wt. %, based on the weight of the polyester resin, of one or more aliphatic, saturated or unsaturated monocarboxylic acids having 8 to 30 carbon atoms, and 0.4 to 5 wt. %, based on the weight of the polyester resin, of one or more radically polymerizable α,β-unsaturated mono- or di-carboxylic acids having 3 to 8 carbon atoms, or their anhydrides, and
   A2) 40 to 80 wt. %, based on the resin solids content of polyol component A), of a polyacrylate, which is prepared in the presence of component A1), and B) 1 to 70 wt. %, based on the resin solids content of the aqueous dispersion, of one or more blocked polyisocyanates.

The present invention relates also to the use of the resulting dispersions to prepare stoving coatings, preferably for the initial lacquering of motor vehicles, especially as stoving fillers.

DETAILED DESCRIPTION OF THE INVENTION

The aqueous dispersions of the present invention contain 1 to 70 wt. %, preferably 20 to 50 wt. % by weight of polyisocyanate component B), based on the resin solids content of the aqueous dispersion. The aqueous dispersions also preferably contain 30 to 99 wt. %, more preferably 50 to 80 wt. % by weight of polyol component A), based on the resin solids content of the aqueous dispersion. Polyol component A) contains 20 to 60 wt. %, preferably 40 to 55 wt. %, of polyester component A1) and 40 to 80 wt. %, preferably 45 to 60 wt. %, of polyacrylate component A2), wherein the preceding percentages are based on the resin solids content of polyol component A).

Polyester component A1) preferably has a number average molecular weight of 500 to 6000, more preferably 1000 to 3000, an acid number of <15, preferably <12, mg of KOH/g, and an OH number of 50 to 250, more preferably 100 to 180 mg of KOH/g. Polyester component A1) is prepared by the reaction of AI$_{1)}$ 10 to 60%, preferably 30 to 50%, of one or more aliphatic, saturated or unsaturated monocarboxylic acids having 8 to 30 carbon atoms, preferably 80 to 100 wt. % of component AI$_{1)}$ is selected from aliphatic monocarboxylic acids having 12 to 20 carbon atoms and less than two C=C double bonds per molecule.

AI$_{2)}$ 0.4 to 5%, preferably 0.6 to 2%, of one or more α,β-unsaturated mono- or di-carboxylic acids having 3 to 8 carbon atoms, or an anhydride thereof, AI$_{3)}$ 20 to 60%, preferably 25 to 40%, of one or more aliphatic, cycloaliphatic or aromatic di-, tri- or tetra-carboxylic acids having 2 to 40, preferably 2 to 20, carbon atoms, or their anhydrides, AI$_{4)}$ 10 to 60%, preferably 20 to 50%, of one or more aliphatic alcohols having 1 to 4 OH groups per molecule, AI$_{5)}$ 0 to 10% of one or more aromatic monocarboxylic acids, AI$_{6)}$ 0 to 10% of other COOH— or OH-reactive compounds, such as epoxides, isocyanates, amines or oxazolines, having 1 to 4, preferably 1.9 to 2.5, functional groups per molecule, wherein the percentages of components AI$_{1)}$ to AI$_{6)}$ are weight percents and add up to 100.

Polyacrylate component A2) is prepared in the presence of polyester component A1) by the radical polymerization of a mixture of by the reaction of AII$_{1)}$ 20 to 70%, preferably 25 to 50%, of one or more non-functional esters of α,β-unsaturated carboxylic acids having 3 to 12 carbon atoms and aliphatic or cycloaliphatic monoalcohols having 1 to 20 carbon atoms, AII$_{2)}$ 1 to 10%, preferably 2 to 7%, of one or more α,β-unsaturated carboxylic acids having 3 to 12 carbon atoms, or their anhydrides, AII$_{3)}$ 0 to 95% of one or more hydroxy-functional, radically polymerizable monomers and AII$_{4)}$ 0 to 40%, preferably 0 to 20%, of radically polymerizable monomers other than AII$_{1)}$ to AII$_{3)}$, wherein the percentages of AII$_{1)}$ to AII$_{4)}$ are weight percents and add up to 100.

The aqueous dispersions of the present invention are preferably prepared by initially forming polyester component A1) and subsequently preparing polyacrylate component A2) by polymerizing the preceding monomers in the presence of polyester component A1).

In order to prepare polyol component A) according to the invention, the polyester component AI) is first synthesized in known manner. The polyester component of the polyol dispersion according to the invention contains as the constituent AI$_{1)}$ one or more aliphatic monocarboxylic acids having 8 to 30 carbon atoms. Examples of saturated monocarboxylic acids having 8 to 30 carbon atoms include 2-ethylhexanoic acid, octanoic acid (caprylic acid), decanoic acid (capric acid), dodecanoic acid (lauric acid), hexadecanoic acid (cetylic acid) or octadecanoic acid (stearic acid).

Also suitable are aliphatic, mono- or poly-unsaturated monocarboxylic acids having 8 to 30 carbon atoms, such as oleic acid, linoleic acid or linolenic acid. Preferred are mixtures of monocarboxylic acids, such as those formed in the hydrolysis of natural oils and fats. Examples of such fatty acids include soybean oil fatty acid, tall oil fatty acid, linseed oil fatty acid, castor oil fatty acid, coconut oil fatty acid, groundnut oil fatty acid and safflower oil fatty acid. Other suitable examples of monocarboxylic acids having 8 to 30 carbon atoms are hydrogenated fatty acids, synthetic fatty acids, for example from paraffin oxidation or Koch synthesis (J. Falbe, New Syntheses with Carbon Monoxide, Berlin, Heidelberg, New York (1980)). Preferred are aliphatic carboxylic acids having less than two C=C double bonds.

Other components of the polyesters according to the invention are α,β-unsaturated mono- or di-carboxylic acids AI$_{2)}$ having 3 to 8 carbon atoms. Examples of such carboxylic acids include acrylic acid, methacrylic acid, itaconic acid, maleic acid, fumaric acid and tetrahydrophthalic acid. Instead of the free carboxylic acids, it is also possible to use derivatives of carboxylic acids, such as anhydrides or esters, as starting materials for polyester preparation.

Examples of aliphatic, cycloaliphatic or aromatic di-, tri- or tetra-carboxylic acids AI$_{3)}$ having 2 to 40 carbon atoms are phthalic acid, isophthalic acid, terephthalic acid, pyromellitic acid, trimellitic acid, succinic acid, adipic acid, sebacic acid and azelaic acid. Also suitable are dimer fatty acids prepared from natural or synthetic fatty acids. Instead of the free carboxylic acids it is also possible to use derivatives of carboxylic acids, such as anhydrides or esters, as starting materials for polyester preparation.

Examples of OH components AI$_{4)}$ having 1 to 4 OH groups per molecule include aliphatic monoalcohols, such as butanol, pentanol and 2-ethylhexanol. Also suitable are "fatty alcohols", which are formed in the reduction of fatty acids. Examples of alcohol components having 2 OH groups include ethylene glycol, neopentyl glycol, 1,4-butanediol, 1,6-hexanediol, trimethylpentanediol, 1,4-cyclohexane-dimethanol, diethylene glycol, triethylene glycol, tripropylene glycol and hydrogenated bisphenol. Examples of alcohol components having 3 or more OH groups are pentaerythritol, glycerol and trimethylolpropane. Preferably, trihydric and higher alcohol components, optionally in combination with dihydric alcohols are used as OH components AI$_{4)}$ Examples of monocarboxylic acids AI$_{5)}$ include benzoic acid and alkylbenzoic acids.

The preparation of polyester component AI) may be carried out by polycondensation as described in the literature (R. Dhein, K. Reuter, G. Ruf in "Houben-Weyl, Methoden der Organischen Chemie Vol. E20/2", eds: H. Bartl, J. Falbe, 4th edition p. 1429–1435, Stuttgart, New York (1987)). However, it is also possible to react the polyester with other compounds AI$_{6)}$ to incorporate urethane or amide groups into the polyester. Examples include OH-reactive compounds, such as polyisocyanates, and COOH—reactive compounds, such as compounds containing epoxide, amino or oxazoline groups.

Suitable polyisocyanates are preferably aliphatic polyisocyanates, such as hexamethylene diisocyanate, isophorone diisocyanate, methylene-bis-(4-isocyanatocyclohexane), tetramethylxylylene diisocyanate, or modified aliphatic polyisocyanates containing isocyanurate, uretdione or biuret groups. Also suitable, although less preferred, are aromatic polyisocyanates, such as toluylene diisocyanate or methylene-bis-(4-isocyanatobenzene). Suitable epoxides include epoxy resins based on the diglycidyl ether of bisphenol A, or Cardura E 10 (Shell). Suitable amines include hexamethylene diamine, isophorone diamine, diethylene triamine and ethylene diamine.

In the process according to the invention polyacrylate component AII) is prepared by free radical polymerization in the presence of polyester component AI). Because of the reaction of the components $AII_{1)}$–$AII_{4)}$ with the α,β-unsaturated polyester components, graft copolymerization takes place. The resulting graft copolymer has a higher molecular weight and, especially, better tolerability than a mixture of polyester and polyacrylate components.

Preferably, the polymerization reaction is conducted in at least two stages, i.e., a mixture of monomers is initially added and polymerized followed the addition and polymerization of a second mixture of monomers. The two-stage addition is preferably carried out such that the first stage product has an acid number of less than 10 mg of KOH/g and the second stage product has an acid number of more than 20 mg of KOH/g.

In addition to the component AI), organic solvents may also be present during the polymerization. Suitable organic solvents include those which are known for the preparation of polyacrylate resins and for the preparation of aqueous dispersions. Examples include alkylbenzenes such as toluene, xylene and ethylbenzene; and alcohols such as n-butanol, isopropanol, ethylene glycol monobutyl ether, diethylene glycol monobutyl ether, tripropylene glycol, 3-methyl-3-methoxybutanol, 1-methoxypropyl-acetate-2 and dipropylene glycol dimethyl ether. Also suitable are acetone, butanone, ethanol, propanol and hexane. The solvents can be partially or completely removed from the reaction mixture before, during or after the dispersing step, e.g., azeotropically and/or by application of a vacuum or a strong stream of inert gas.

In one embodiment components $AII_{1)}$ to $AII_{4)}$ are added separately, together or partially mixed at a suitable temperature to component AI) and optionally a solvent and are polymerized in the presence of a polymerization initiator. Suitable polymerization initiators are known and include peroxides such as dibenzoyl peroxide, di-tert-butyl peroxide and tert-butyl-per-2-ethyl hexanoate; and azo initiators such as azo-bis-isobutyronitrile and azo-bis-isovaleronitrile. It is also possible to carry out the polymerization in the presence of regulators. Suitable regulators, which reduce the molar weight of the polymers by radical transfer, are also known and include n-dodecylmercaptan and mercaptoacetic acid.

In order to achieve particular properties, one or more monomers may be added more rapidly or more slowly, or beginning earlier and/or ending later than the other monomers.

Component $AII_{1)}$ is selected from any copolymerizable (cyclo)alkyl esters of (meth)acrylic acid having 1 to 20 carbon atoms in the cycloalkyl moiety or mixture thereof. Preferred are alkyl acrylates or methacrylates having 1 to 18 carbon atoms in the alkyl moiety. Examples include methyl, ethyl, n-propyl, n-butyl, isobutyl, n-hexyl, 2-ethylhexyl, n-stearyl and n-lauryl acrylates and methacrylates, and also cycloaliphatic (meth)acrylic acid esters, such as cyclohexyl (meth)acrylate and norbornyl (meth)acrylate. Also suitable are esters of maleic or fumaric acid, such as maleic acid and fumaric acid dimethyl or diethyl esters.

Examples of suitable α,β-unsaturated carboxylic acids $AII_{2)}$ include acrylic acid, methacrylic acid, itaconic acid, maleic acid, fumaric acid and tetrahydrophthalic acid. Instead of the free carboxylic acids it is also possible to use the corresponding anhydrides as the starting material.

Suitable hydroxy-functional monomers $AII_{3)}$ include the hydroxyalkyl or hydroxycycloalkyl esters of the acids mentioned under $AII_{2)}$. The hydroxy-functional esters may be obtained by the reaction of (meth)acrylic acid with an alkylene oxide or an aliphatic diol. Examples include 2-hydroxyethyl (meth)acrylate, 2-hydroxypropyl (meth)acrylate, 3-hydroxy-propyl (meth)acrylate, 4-hydroxybutyl (meth)acrylate and the reaction products of (meth)acrylic acid with monoepoxides, such as Cardura E10 (Shell). Also suitable are the esters of (meth)acrylic acid and oligomeric or polymeric ethylene or propylene glycols. Also suitable, but less preferred, are radically polymerizable monomers containing OH groups, which are not derived from α,β-unsaturated carboxylic acids.

Examples of other radically polymerizable monomers $AII_{4)}$ include vinylaromatic compounds, such as styrene and α-methylstyrene; vinyl esters of carboxylic acids having 1 to 20 carbon atoms, such as versatic acid, propionic acid and acetic acid; vinyl ethers; vinylpyrrolidone; and compounds having two or more radically polymerizable double bonds such as butanediol di(meth)acrylate, hexanediol di(meth)acrylate, divinylbenzene and polybutadiene.

To prepare the polyol dispersions according to the invention, the acid groups of the polyester-polyacrylate graft copolymer are converted into the salt form, preferably by reaction with an amine. Preferred amines are tertiary amines, such as triethylamine, N,N-dimethylethanolamine and N,N-dimethyl-isopropanolamine. Neutralization may also be carried out with metal hydroxides such as potassium, sodium or lithium hydroxide; primary or secondary amines; and ammonia.

In order to convert the resin which has been rendered hydrophilic into an aqueous dispersion, water is subsequently added to the resin with vigorous stirring. However, it is also possible to place water in a vessel and add, with stirring, the hydrophilic resin. In a less preferred method the neutralizing agent is dissolved in the water used for the dispersion and the resin, which has not been rendered hydrophilic, is added with stirring or the resin, which has not been rendered hydrophilic, is placed in a vessel and the solution of the neutralizing amine in water is added with stirring.

The stoving lacquer can then be prepared by blending the resulting polyol dispersion with the crosslinking components. Blocked polyisocyanates are preferably used as the crosslinking component. In order to incorporate the blocked polyisocyanate into the aqueous lacquer, it is possible to mix the polyol dispersion with a blocked polyisocyanate which has been rendered hydrophilic. Preferably, hydrophobic blocked polyisocyanates, which have not been rendered hydrophilic, are mixed with the polyester-polyacrylate resin before neutralizing and dispersing the latter resin.

Examples of polyisocyanates, which can be used to prepare the blocked polyisocyanates, include cycloaliphatic, aliphatic or aromatic polyisocyanates, such as tetramethylene diisocyanate, cyclohexane 1,3-and 1,4-diisocyanate, hexamethylene diisocyanate (HDI), 1-isocyanato-3,3,5-trimethyl-5-isocyanatomethylcyclohexane (isophorone diisocyanate, IPDI), methylene-bis-(4-isocyanatocyclohexane) and tetramethyl xylylene diisocyanate (TMXDI). Also suitable, although less preferred, are aromatic polyisocyanates, such as toluylene diisocyanate (TDI), diphenylmethane 2,4'-and/or 4,4'-diisocyanate (MDI), triphenylmethane 4,4'-diisocyanate and naphthylene 1,5-diisocyanate.

Preferred polyisocyanates are those containing heteroatoms in the radical containing the isocyanate groups, such as polyisocyanates containing carbodiimide groups, allophanate groups, isocyanurate groups, urethane groups and biuret groups. Especially preferred are the known lacquer polyisocyanates which are modification products which are prepared from the preceding monomeric polyisocyanates, especially hexamethylene diisocyanate or isophorone diisocyanate, and contain biuret, isocyanurate or uretdione groups. Also suitable are low molecular weight polyisocyanates containing urethane groups, which can be obtained by the reaction of an excess of IPDI or TDI with simple polyhydric alcohols having a molecular weight of 62 to 300, preferably trimethylol-propane or glycerol. Mixtures of the preceding polyisocyanates may also be used for the preparation of the products according to the invention.

Suitable polyisocyanates also include the known NCO prepolymers, which may be obtained by reacting the preceding monomeric polyisocyanates, preferably diisocyanates, with compounds containing at least two isocyanate-reactive groups, preferably OH groups, at an equivalent ratio of isocyanate groups to isocyanate-reactive groups of 1.05:1 to 10:1, preferably 1.1:1 to 3:1. The nature of the starting materials and their amounts are selected such that the NCO prepolymers preferably have an average NCO functionality of 2 to 3 and a number average molecular weight of 500 to 10,000, preferably 800 to 4000.

The isocyanate groups of the polyisocyanates are fully blocked with known blocking agents for stoving lacquers. Examples of suitable blocking agents include malonic acid dimethyl ester, malonic acid diethyl ester, acetoacetic acid ethyl ester, ε-caprolactam, acetanilide, secondary aliphatic amines and/or acetoneoxime. Preferred blocking agents include butanone oxime, 3,5-dimethylpyrazole and 1,2,4-triazole.

Blocking of the polyisocyanates may be carried out by heating the polyisocyanate with the blocking agent. For example, one or more polyisocyanates can be placed in a vessel and heated, with stirring, to approximately 80° C. and the blocking agent can be added (for example, over a period of approximately 10 minutes). Stirring is carried out until no more free isocyanate groups are detectable. It is also possible to block one or more polyisocyanates with a mixture of two or more blocking agents.

The blocked polyisocyanates are preferably hydrophobic, i.e., they are not rendered hydrophilic. They are preferably converted into an aqueous dispersion by mixing and dispersing together with the polyol resin. However, it is also possible to disperse the polyol on its own and add to the aqueous phase a solution or dispersion of a blocked polyisocyanate which has been rendered hydrophilic. Hydrophilic blocked polyisocyanates are known and described, e.g., in EP-A 566,953.

Stoving lacquers containing the polyols according to the invention and blocked isocyanates can be combined with other binders, e.g., water soluble or water insoluble melamine resins, hydrophilic blocked polyisocyanates and/or water dilutable polyesters or water dilutable polyester/polyurethane resins. The stoving lacquers may preferably contain 2 to 15 wt. % of water soluble or water insoluble water dispersible melamine resins or hydrophilic blocked polyisocyanates and/or 2 to 30 wt. % of water dilutable polyesters or water dilutable polyester/polyurethane resins, wherein the preceding percentages are based on the resin solids content of the stoving lacquer.

The stoving lacquers or coating compositions may also contain known additives, such as pigments and fillers, in amounts which are also known in the art.

The stoving lacquers are preferably used for the initial coating of motor vehicles, especially for the preparation of filler coats that are resistant to the impact of stones. The coating compositions can be applied by knife application, dipping, spray application (such as compressed-air or airless spraying) and electrostatic application (such as high-speed rotating bell application). The layer thickness of the dry film is about 10 to 80 pm. The drying conditions for the stoving lacquers are dependent on blocking agent for component B). In general, the temperatures are 80 to 200° C. A constant temperature over a period of 10 to 30 minutes is preferred. The preferred stoving range is about 135 to 170° C over a period of about 20 minutes.

The coating compositions containing the dispersions according to the invention have very good storage stability. The chemical degradation by cleavage of ester bonds, which usually takes place when aqueous polyester dispersions or solutions or polyester-polyurethane dispersions are stored, is not observed with the polyester-polyacrylate dispersions according to the invention. At the same time, the coatings prepared from the dispersions according to the invention have excellent resistance to the impact of stones, which in the case of aqueous lacquers could previously be achieved only by systems based on polyester dispersions.

The invention is further illustrated but is not intended to be limited by the following examples in which all parts and percentages are by weight unless otherwise indicated.

EXAMPLES

Example 1—Polyester Resin 4041 g of groundnut oil fatty acid, 4350 g of trimethylolpropane, 1131 g of triethylene glycol, 99 g of maleic anhydride, 2035 g of phthalic anhydride and 2008 g of adipic acid were weighed into a 15 liter reaction vessel equipped with a stirring, cooling and heating device and a separator. Nitrogen was passed through the reaction mixture. The batch was heated to 185° C. In 4 hours. After 2 hours at 185° C., it was heated to 220° C. in the course of an additional 2 hours. A strong stream of nitrogen (approximately 30 liters/hour) was passed through the batch at that temperature until the acid number had fallen to 9 mg of KOH/g. The OH number was 196 mg of KOH/g.

Example 2—Polyester-polyacrylate Resin 500 g of the polyester resin of Example 1 and 33.4 g of butyl diglycol (diethylene glycol monobutyl ether) were placed, under a nitrogen atmosphere, in a 6 liter four-necked flask equipped with an internal thermometer, a stirring device, a dropping funnel, a gas inlet and a reflux condenser. A monomer mixture of 75 g of hydroxyethyl methacrylate, 56 g of butyl acrylate, 271 g of methyl methacrylate and 50 g of styrene was prepared in the dropping funnel. At a temperature of 145° C., half the monomer mixture was metered in over a period of 3 hours. In parallel, a solution of 10 g of di-tert-butyl peroxide in 40 g of butyl diglycol was metered in. 48 g of acrylic acid were then added to the rest of the monomer mixture, and the whole was mixed. The other half of the monomer mixture was then metered in over a period of 1.5 hours. In parallel, a solution of 5 g of di-tert-butyl peroxide in 20 g of butyl diglycol was metered in. A further solution of 5 g of di-tert-butyl peroxide in 20 g of butyl diglycol was subsequently metered in for the purpose of activation.

Example 3—Blocked Polyisocyanate 600 g of Desmodur L67 (aromatic polyisocyanate based on toluylene diisocyanate, 67% dissolved in 1-methoxypropylacetate-2/xylene (1:1), isocyanate content 11.5%) were heated to 65° C. In a 2 liter four-necked flask equipped with a reflux condenser, an internal thermometer and a stirrer. 143 g of butanone oxime were then added dropwise over a period of one hour. Stirring was carried out until an isocyanate band was no longer detectable in the infra-red spectrum.

Example 4—Self-crosslinking Polyester-polyacrylate Dispersion 1108 g of the polyester-polyacrylate resin of Example 2 and 669 g of the blocked isocyanate of Example 3 were homogenized at 70° C., under a nitrogen atmosphere, in a 6 liter four-necked flask equipped with an internal thermometer, a stirring device, a gas inlet and a reflux condenser. 64 g of N,N-dimethylethanolamine were added, and stirring was carried out for 30 minutes. 1315 g of water were then added. The product was a milky aqueous dispersion having an average particle size of 295 nm (determined by laser correlation spectroscopy), a viscosity of 1500 mPa·s and a solids content of 40.0%.

Example 5—Self-crosslinking Polyester-polyacrylate Dispersion 600 g of the polyester-polyacrylate resin of Example 2 and 613 g of Desmodur BL 3175 (blocked polyisocyanate resin based on hexamethylene diisocyanate, 75% dissolved in solvent naphtha 100 solvent) were homogenized at 70° C. under a nitrogen atmosphere in a 4 liter four-necked flask equipped with an internal thermometer, a stirring device, a gas inlet and a reflux condenser. 61 g of N,N-dimethylethanolamine were added, and stirring was carried out for 30 minutes. 1153 g of water were then added. The product was a milky aqueous dispersion having an average particle size of 213 nm (determined by laser correlation spectroscopy), a viscosity of 3574 mPa·s and a solids content of 43.2%.

Example 6—Stoving Lacquer from the Self-crosslinking Polyester-polyacrylate Dispersion of Example 4

45.18 g of a mill paste, which was milled for 30 minutes in a commercial bead mill, consisting of 12.56 g of 42% polyester-polyurethane dispersion, 9.6 g of distilled water, 1 g of butyl diglycol, 0.15 g of an antifoaming agent (Bayer, DNE antifoaming agent), 0.43 g of a commercial wetting agent, 14.72 g of titanium dioxide (Bayertitan R-KB-4), 0.14 g of black iron oxide (Bayferrox 303 T), 4.05 g of barium sulfate (Blanc fixe Micro, Sachtleben GmbH), 2.7 g of talcum (Micro Talc IT Extra, Norwegian Talc) and 0.41 g of an antisettling agent (Aerosil R 972, Degussa), were stirred with 49.1 g of the 40% polyester-polyacrylate dispersion of Example 4, 5.2 g of a commercial aqueous blocked polyisocyanate (Bayhydur BL 5140) and 0.6 g of a commercial base wetting agent, and diluted with distilled water to a spraying viscosity of approximately 22 s (Ford DIN beaker 4 mm). The coating was applied by means of a flow beaker spray gun having a nozzle diameter of 1.5 mm and an atomizer pressure of 5 bar onto the substrates described below in a thickness sufficient to provide a dry film thickness of 25 to 35 μm.

Example 7—Stoving Lacquer from the Self-crosslinking Polyester-polyacrylate Dispersion of Example 5

45.18 g of the mill paste described in Example 6 were stirred with 45.65 g of the 43% polyester-polyacrylate dispersion of Example 5, 5.2 g of a commercial aqueous blocked polyisocyanate (Bayhydur BL 5140) and 0.6 g of commercial base wetting agent, and diluted with distilled water to a spraying viscosity of approximately 20 to 22 s (Ford DIN beaker 4 mm). The coating was applied by means of a flow beaker spray gun having a nozzle diameter of 1.5 mm and an atomizer pressure of 5 bar onto the substrates described below in a thickness sufficient to provide a dry film thickness of 25 to 35 μm.

The wet lacquer films of Examples 6 and 7 were exposed to the air for 5 minutes at 23° C. and then stoved in an air-circulating oven. The coatings were applied to glass plates for testing pendulum hardness and gloss, and to cathodic electro-dipcoated steel plates of the type used in automobile production for the stone impact tests.

Test Results

The following test results were obtained after crosslinking at 140° C. (first value) and 160° C. (second value); stoving time in each case 30 minutes.

| Example | Pendulum hardness | Gloss 60° % | VDA stone impact test | BMW notch (RT) |
|---|---|---|---|---|
| 6 | 126/131 | 87/87 | 1/1 | i.O./i.O. |
| 7 | 63/102 | 90/86 | 1/1 | i.O./0.3 mm |

Pendulum hardness was determined by the vibration fatigue test according to König DIN 53 157. Gloss measurement was measured according to Gardner 60°. VDA stone impact test was based on the VW specification using 2×500 g of steel shot at 1.5 bar air pressure. Index 1–10 (1=no holes, 10=very large and very many areas where the lacquer has been separated from the steel plate). Stone impact test was based on BMW specification using individual impact test device ESP 10 from Byk at a test pressure of 3 bar (determination of the parting plane in mm from the steel plate).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous dispersion comprising
   A) a polyol component comprising
      AI) 20 to 60 wt. %, based on the resin solids content of polyol component A), of a polyester resin containing 10 to 60 wt. %, based on the weight of the polyester resin, of one or more aliphatic, saturated or unsaturated monocarboxylic acids having 8 to 30 carbon atoms, and 0.4 to 5 wt. %, based on the weight of the polyester resin, of one or more radically polymerizable α,β-unsaturated mono- or di-carboxylic acids having 3 to 8 carbon atoms, or their anhydrides, and
      AII) 40 to 80 wt. %, based on the resin solids content of polyol component A), of a polyacrylate, which is prepared in the presence of component AI), and
   B) 1 to 70 wt. %, based on the resin solids content of the aqueous dispersion, of one or more blocked polyisocyanates.

2. The aqueous dispersion of claim 1 wherein polyester component AI) has a number average molecular weight of 500 to 6000, an acid number of <12 KOH/g and an OH number of 50 to 250 mg of KOH/g, and is prepared from
   $AI_{1)}$ 10 to 60% of one or more aliphatic, saturated or unsaturated monocarboxylic acids having 8 to 30 carbon atoms, AI$_{2)}$ 0.4 to 5% of one or more α,β-unsaturated mono- or di-carboxylic acid having 3 to 8 carbon atoms, or an anhydride thereof, AI$_{3)}$ 20 to 60% of one or more aliphatic, cycloaliphatic or aromatic di-, tri- or tetra-carboxylic acids having 2 to 40 carbon atoms, or their anhydrides, AI$_{4)}$ 10 to 60% of one or more aliphatic alcohols having 1 to 4 OH groups per molecule, AI$_{5)}$ 0 to 10% of one or more aromatic monocarboxylic acids, AI$_{6)}$ 0 to 10% of one or more other COOH— or OH-reactive compounds having 1 to 4 reactive groups per molecule, wherein the percentages of components AI$_{1)}$ to AI$_{6)}$ are weight percents and add up to 100.

3. The aqueous dispersion of claim 1 wherein polyacrylate component AII) is prepared in the presence of polyester component AI) by the radical polymerization of a mixture of AII$_{1)}$ 20 to 70% of one or more non-functional esters of α,β-unsaturated carboxylic acids having 3 to 12 carbon atoms and aliphatic or cycloaliphatic monoalcohols having 1 to 18 carbon atoms, AII$_{2)}$ 1 to 10% of one or more α,β-unsaturated carboxylic acids having 3 to 12 carbon atoms, or their anhydrides, AII$_{3)}$ 0 to 95% of one or more hydroxy-functional, radically polymerizable monomers, AII$_{4)}$ 0 to 40% of one or more radically polymerizable monomers other than AII$_{1)}$ to AII$_{3)}$, wherein the percentages of AII$_{1)}$ to AII$_{4)}$ are weight percents and add up to 100.

4. The aqueous dispersion of claim 2 wherein polyacrylate component AII) is prepared in the presence of polyester component AI) by the radical polymerization of a mixture of AII$_{1)}$ 20 to 70% of one or more non-functional esters of α,β-unsaturated carboxylic acids having 3 to 12 carbon atoms and aliphatic or cycloaliphatic monoalcohols having 1 to 18 carbon atoms, AII$_{2)}$ 1 to 10% of one or more α,β-unsaturated carboxylic acids having 3 to 12 carbon atoms, or their anhydrides, AII$_{3)}$ 0 to 95% of one or more hydroxy-functional, radically polymerizable monomers, AII$_{4)}$ 0 to 40% of radically polymerizable monomers other than AII$_{1)}$ to AII$_{3)}$, wherein the percentages of AII$_{1)}$ to AII$_{4)}$ are weight percents and add up to 100.

5. The aqueous dispersion of claim 1 wherein polyisocyanate component B) has not been rendered hydrophillic.

6. The aqueous dispersion of claim 2 wherein polyisocyanate component B) has not been rendered hydrophilic.

7. The aqueous dispersion of claim 3 wherein polyisocyanate component B) has not been rendered hydrophilic.

8. The aqueous dispersion of claim 4 wherein polyisocyanate component B) has not been rendered hydrophilic.

9. The aqueous dispersion of claim 1 wherein polyol component A) contains 40 to 55 wt. % of polyester component AI) and 45 to 60 wt. % of polyacrylate component AII).

10. The aqueous dispersion of claim 9 wherein polyester component AI) has a number average molecular weight of 1000 to 3000.

11. The aqueous dispersion of claim 1 wherein polyester component AI) contains 30 to 50% of said moncarboxylic acids having 8 to 30 carbon atoms.

12. The aqueous dispersion of claim 2 wherein component AII$_{1)}$ contains 80 to 100 wt. % of one or more aliphatic monocarboxylic acids having 12 to 20 carbon atoms and less than two C=C double bonds per molecule.

13. The aqueous dispersion of claim 4 wherein polyacrylate component AII) is polymerized by the addition of monomers in two stages, such that the first stage product has an acid number of less than 10 mg of KOH/g and the second stage product has an acid number of more than 20 mg of KOH/g.

14. A stoving lacquer containing the aqueous dispersion of claim 1.

15. A stoving lacquer containing the aqueous dispersion of claim, 1 and also 2 to 15 wt. % of a water dispersible melamine resin or a v hydrophilic blocked polyisocyanate and/or 2 to 30 wt. % of water dilutable polyester or polyester/polyurethane resin, wherein the preceding percentages are based on the resin solids content of the stoving lacquer.

16. A coated substrate coated with the stoving lacquer of claim 14.

17. A coated substrate coated with the stoving lacquer of claim 15.

* * * * *